Sept. 22, 1936.  E. KAUFMANN  2,055,413
BRAKE
Filed Oct. 15, 1935  2 Sheets-Sheet 1
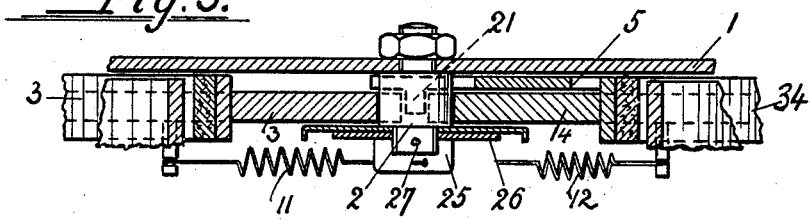
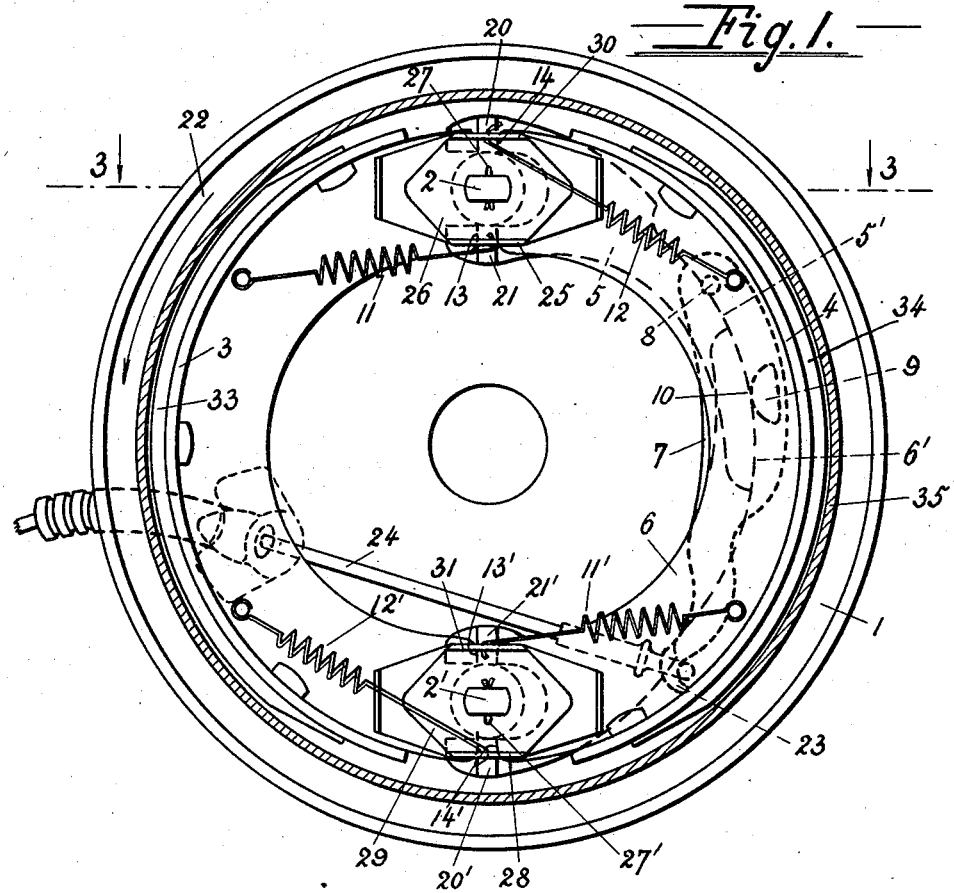
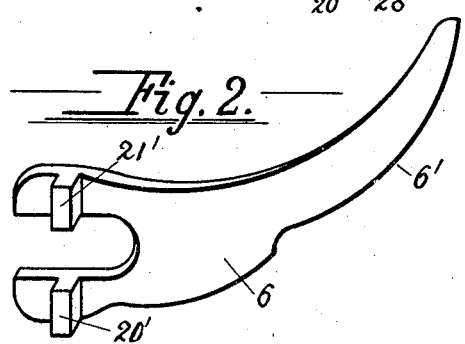
Inventor
Egon Kaufmann.
per Karl A. May
Attorney.

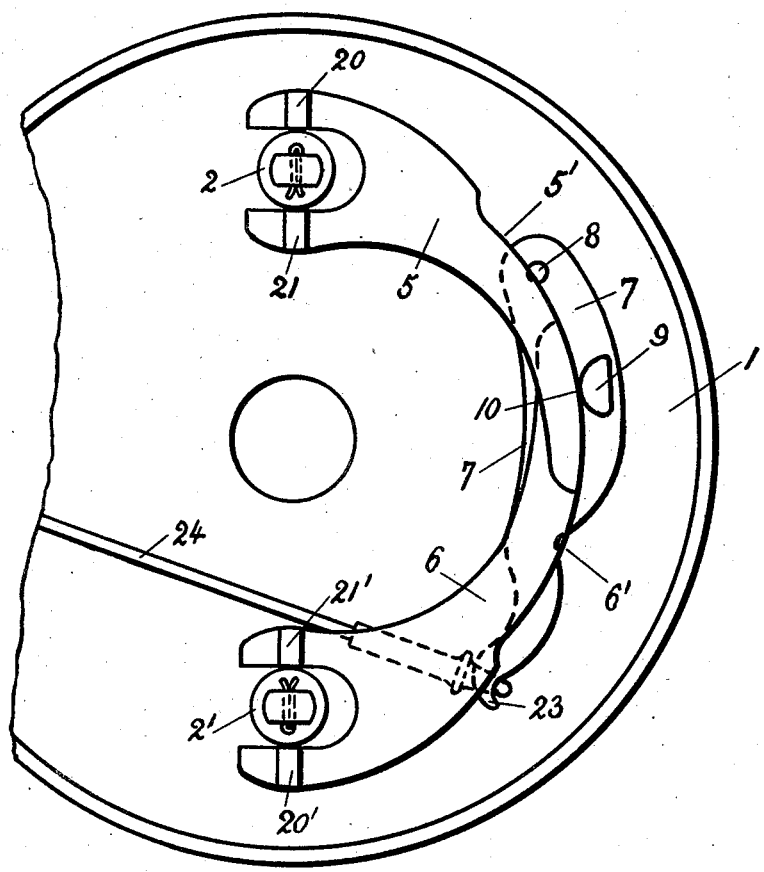

Patented Sept. 22, 1936

2,055,413

UNITED STATES PATENT OFFICE 2,055,413

BRAKE

Egon Kaufmann, Mannheim, Germany, assignor to Deutsche Perrot Bremse G. m. b. H., Mannheim-Friedrichsfeld, Germany Application October 15, 1935, Serial No. 45,111
In Germany September 19, 1934

7 Claims. (Cl. 188—78)

The present invention relates to brakes, particularly two-block brakes, for automobiles in which the blocks can, within limits, freely and circumferentially move between two thrust blocks and in which the blocks are forced on to the brake drum by means of spreading levers which engage said blocks.

An object of this invention resides in the provision of a brake system of the type described in the paragraph next above in which the spreading levers are built as elbow levers the long arms of which extend in circumferential direction, overlap one another, and are operated simultaneously by an operating mechanism common to both levers.

Another object of the present invention is to provide a brake of the type described in the foregoing paragraphs in which the long arms of the spreading levers are provided with circular curves having the same center point as the brake drum and on which the brake operating mechanism acts and which permit circumferential movement of the blocks with respect to the brake drum, for example, when the direction of rotation of the drum is changed, due to which arrangement a change of the position of the brake blocks does not affect the brake operating mechanism, and an undesirable brake action or jambing of the brake, for example, when changing over from forward to return driving is made impossible.

A further object of this invention is the provision of a brake system of the type described in the paragraphs next above in which the point at which the operating mechanism acts on the long arms of the spreading levers is so located that the spreading power transmitted to the brake shoes is equal or almost equal at the prevailing direction of rotation of the brake drum, i. e., that, when the car goes forwards, an equal action of both brake shoes is assured.

Another object of this invention resides in the provision of a brake system of the type described in the foregoing paragraphs in which the springs by means of which the brake shoes are pulled towards the thrust blocks are so adjusted that, at the prevailing direction of rotation of the brake drum, the individual brake shoes are brought onto the drum gradually and counter to the direction of rotation of the drum, due to which fact a considerably greater braking action is obtained as compared with that of a conventional two-block brake, and the brake action is in proportion to the pressure exerted on the foot pedal, and jambing of the brake is practically eliminated.

A further object of the present invention is to provide a brake which is simple to manufacture and having a very small number of individual parts and great, equal, and self-increasing brake power for all blocks.

Further and other objects of the present invention will be hereinafter set forth in the accompanying specification and claims and shown in the drawings which, by way of illustration, show what I now consider to be a preferred embodiment of my invention.

In the drawings:

Fig. 1 is a top view of a brake mechanism according to my invention.

Fig. 2 is a perspective showing of a spreading lever according to my invention.

Fig. 3 is a part sectional view taken along lines 3—3 in Fig. 1 and looking in the direction of the arrows.

Fig. 4 is a top view of the operating lever assembly as mounted on the back plate.

Like parts are designated by like numerals in all the figures of the drawings. The lead lines to elements shown in dotted lines are dotted.

Referring more particularly to the drawings: 35 is the brake drum. I is the back plate to which two bolts 2 and 2' are fixed which serve as thrust blocks for the two brake blocks 3 and 4. Projections 20 and 21 and 20' and 21' of the spreading levers 5 and 6 are located between the ends of blocks 3 and 4. The long arms of levers 5 and 6 are curved and follow substantially a circle which is concentric with the brake drum. These long arms point towards one another, and the ends of the levers overlap one another. Each lever is provided with a curved gliding or rolling surface 5' and 6', respectively; dog 9, which is part of the operating lever 7, rests against these curves. If the direction of rotation and the position of the brake blocks are changed, the curves 5' and 6' run along dog 9 without affecting the brake operating mechanism.

Operating lever 7 swings about bolt 8 which is fixed to the back plate 1. A conventional brake operating member 24 is connected to the free end 23 of lever 8.

Brake block 3 is resiliently pulled towards the thrust blocks 2 and 2' by means of springs 11 and 12'; spring 12' is made stronger than spring 11 for reasons which will be described later. Likewise, block 4 is held to thrust block 2 by means of spring 12 and to thrust block 2' by means of spring 11'. One end of springs 11 and 12' is connected to block 3, the other end of spring 11 is connected to the bent up part 25 of plate 26 which is held to bolt 2 by means of the split pin 27; the other end of spring 12' is connected to bent up part 28 of plate 29 which is held to bolt 2' by split pin 27'. Bent up part 25 is located closer to the center of the brake and part 28 more at the outside of the brake. One end of spring 12 is connected to block 4 and the other end to the outer bent up part 30 of plate 26. One end of spring 11' is connected to block 4 and the other end to the inner bent up part 31 of plate 29.

The long arms of the two spreading levers 5 and 6 have such configuration and the dog 9, by means of which operating lever 7 engages said long arms, has such position that, at the prevailing direction of rotation, the forces transmitted to blocks 3 and 4 are exactly or almost equal, so that both blocks participate in like manner on the brake action, and the wear is the same for both blocks. The following consideration serves to find the correct position for the dog 9:

If the brake drum rotates in the prevailing direction which is indicated by arrow 22 and the brake is applied, block 3 is lifted from bolt 2 and block 4 from bolt 2'. In order to assure this mode of operation, springs 11 and 11' are made weaker than springs 12 and 12'. Spring 12 and 12' hold block 3 to bolt 2' and block 4 to bolt 2, and block 3 is lifted from bolt 2 against the action of the weaker spring 11 and block 4 against the action of the weaker spring 11' from block 2' when the brake is applied. The spreading lever 5 thus turns about point 14 where projection 20 abuts against the outer end of block 4 and presses at point 13 with projection 21 against the inner end of block 3 and removes it from thrust block 2. The leverage is determined by the distances between point 10, which is the point of action of dog 9 on lever 5, and point 414 and between point 13 and 14.

With block 4 and spreading lever 6 conditions are different. In order to apply block 4 in a direction counter to the prevailing direction of rotation of the brake drum to said drum, lever 6 must swing about point 13' thereby lifting block 4 at point 14'. The leverage is determined by the distances between points 10 and 13' and points 13' and 14'.

The position of dog 9 with respect to levers 5 and 6 must be so that an absolutely equal momentum acts on both brake blocks and not only an equal effect of the brake blocks on to the drum is produced but also equal wear of the linings 33 and 34 of blocks 3 and 4 is assured. Therefor this position must be determined by taking into account the leverages described in the two paragraphs next above and the movement of levers 5 and 6 about thrust blocks 2 and 2' and their points of action on the brake blocks 4 and 3. If the point of action of dog 9 is correctly determined, the brake acts equally on the whole circumference of the brake drum at the prevailing direction of rotation of the brake drum.

While I believe the above described embodiments of my invention to be preferred embodiments, I wish it to be understood that I do not desire to be limited to the exact details of design and construction shown and described, for obvious modifications will occur to a person skilled in the art.

What is claimed as new is:

1. A brake comprising a brake drum, a plurality of brake shoes having pairs of disconnected adjacent ends, applying means located within said drum for spreading said pairs of ends, said applying means comprising pairs of overlapping lever arms having a curved configuration which is substantially concentric with said brake drum.

2. A brake comprising a brake drum, a plurality of brake shoes having pairs of disconnected adjacent ends, applying means for spreading said pairs of ends, said applying means comprising lever arms having a curved configuration which is substantially concentric with said brake drum, said lever arms pointing towards and overlapping one another.

3. A brake comprising a brake drum, a plurality of brake shoes having pairs of disconnected adjacent ends, applying means for spreading said pairs of ends, said applying means comprising two lever arms having a curved configuration which is substantially concentric with said brake drum, said lever arms pointing towards one another and having overlapping parts, and an operating member engaging both of said levers at said overlapping parts.

4. A brake comprising a brake drum, a plurality of brake shoes having pairs of disconnected adjacent ends, applying means for spreading said pairs of ends, said applying means comprising two lever arms having a curved configuration which is substantially concentric with said brake drum, said lever arms pointing towards one another and having overlapping parts, and an operating member having means adapted to abuttingly engage both of said levers at said overlapping parts.

5. A brake comprising a brake drum, a plurality of brake shoes having pairs of disconnected adjacent ends, applying means for spreading said pairs of ends, said applying means comprising two lever arms provided with curves which are substantially concentric with said brake drum, said lever arms pointing towards one another and said curves overlapping one another, and an operating member simultaneously engaging said curves of both of said lever arms for operating said brake.

6. A brake comprising a plurality of brake shoes having pairs of disconnected adjacent ends, applying means for spreading said pairs of ends, said applying means comprising two lever arms adapted to swing about points adjacent to said ends and pointing towards and overlapping one another, and an operating member simultaneously engaging both of said lever arms, the place of engagement of said operating member and said lever arms being at different distances from the points about which said lever arms swing for producing equal brake action and equal wear of said brake shoes.

7. A brake comprising a plurality of brake shoes having pairs of disconnected adjacent ends, applying means for spreading said pairs of ends, said applying means comprising two lever arms having a curved configuration which is substantially concentric with said brake, said lever arms pointing towards one another and having overlapping parts, and an operating lever engaging both of said levers at said overlapping parts, said lever arms and said operating lever swinging towards the center of said brake when the brake shoes are applied and swinging from the center of said brake when the brake shoes are released.

EGON KAUFMANN.